July 22, 1952   A. CHRISTENSEN   2,603,813
ELECTRIC WINDSHIELD WIPER
Filed Dec. 8, 1944   4 Sheets-Sheet 1

Inventor:
Alfred Christensen
By Williams, Bradbury & Hinkle
Attorneys.

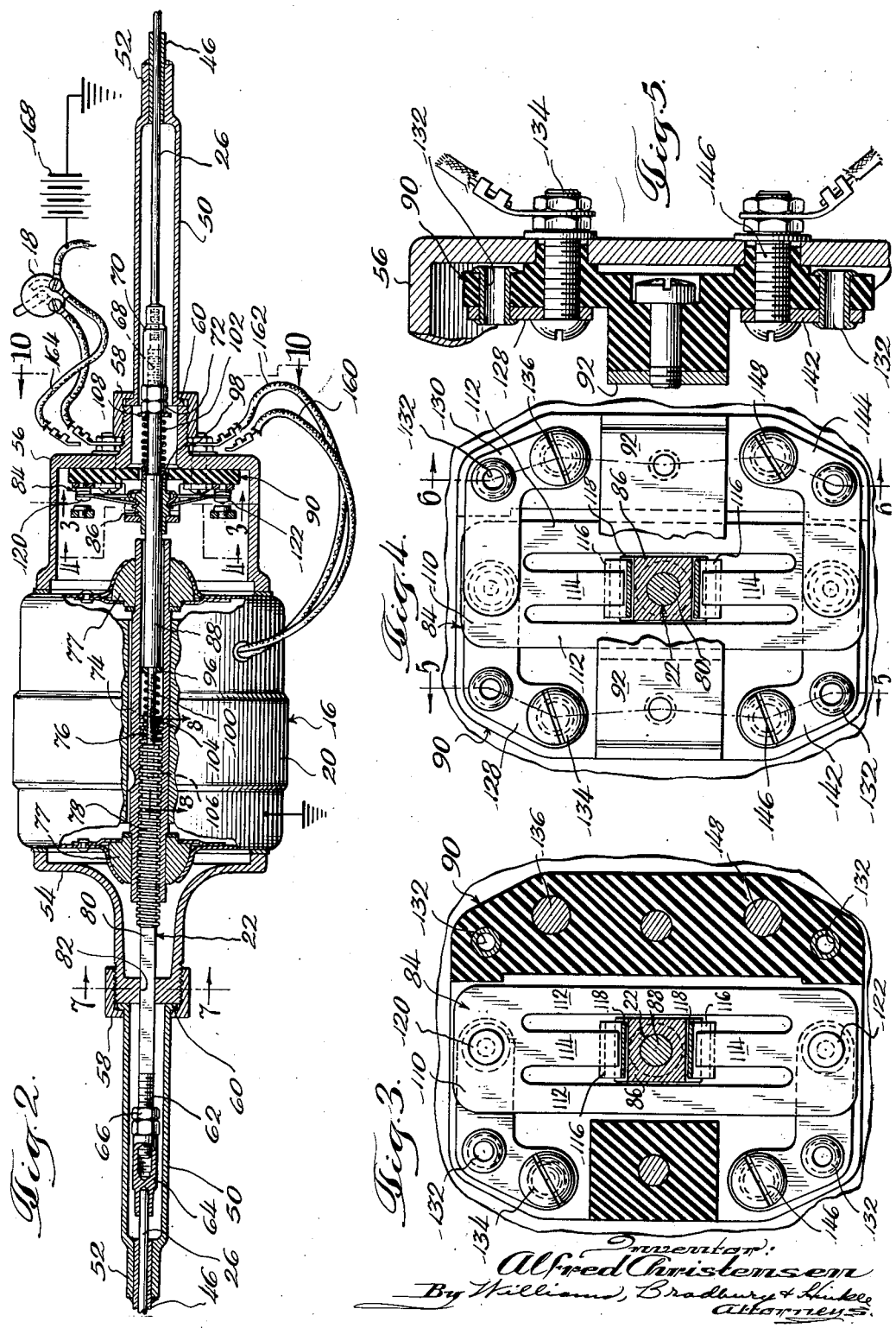

July 22, 1952 A. CHRISTENSEN 2,603,813
ELECTRIC WINDSHIELD WIPER
Filed Dec. 8, 1944 4 Sheets-Sheet 3
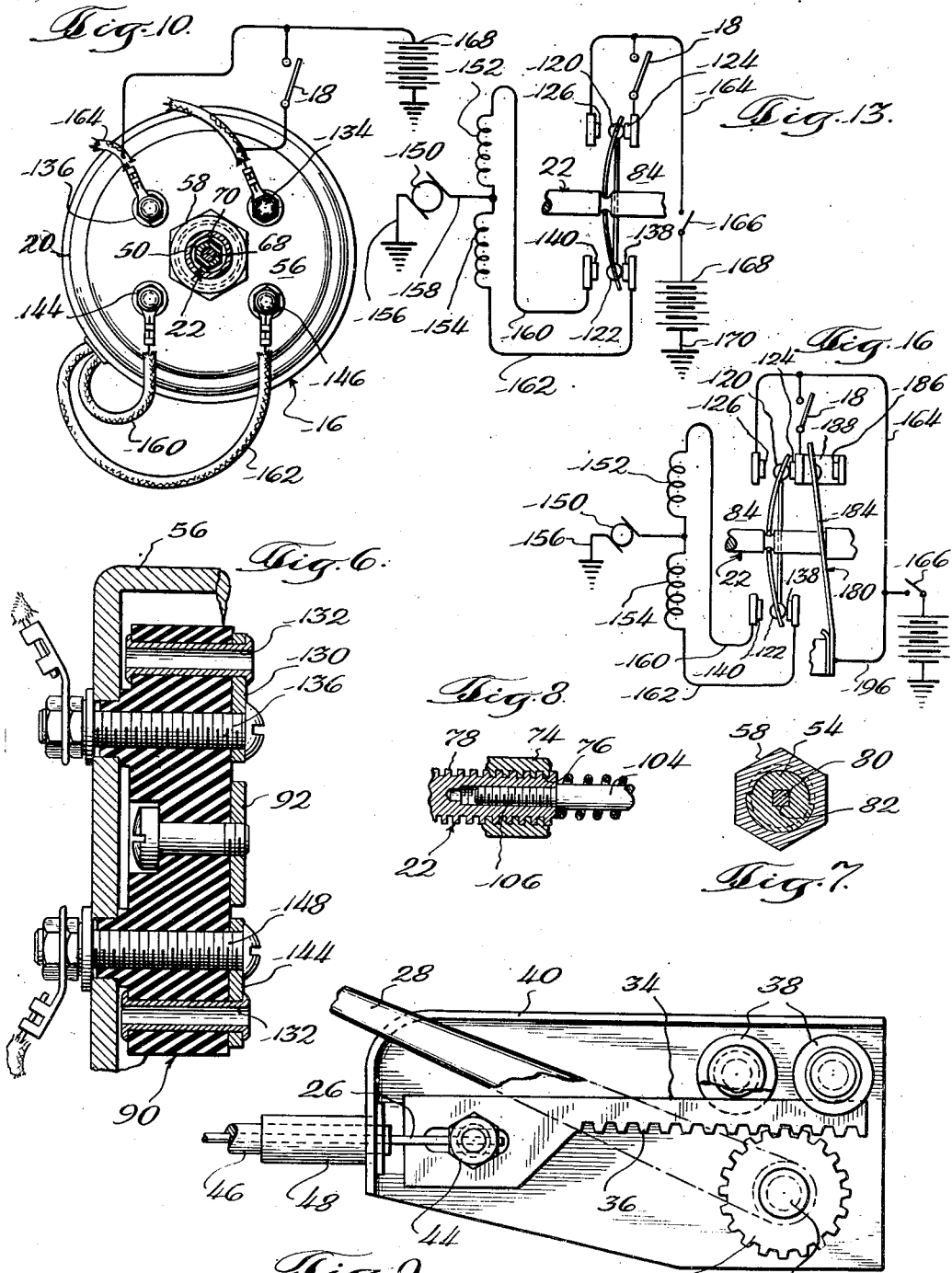

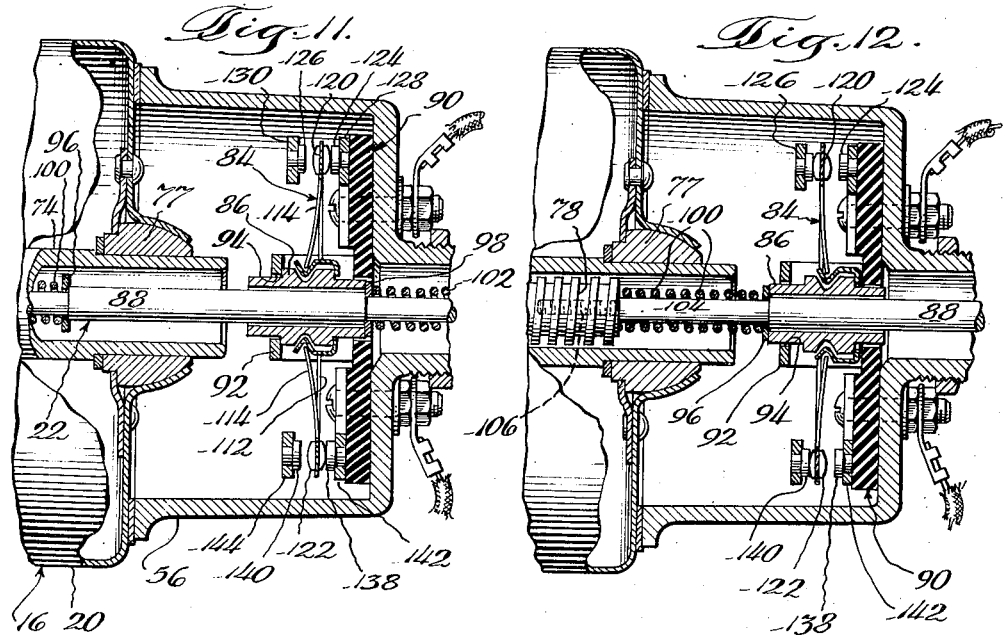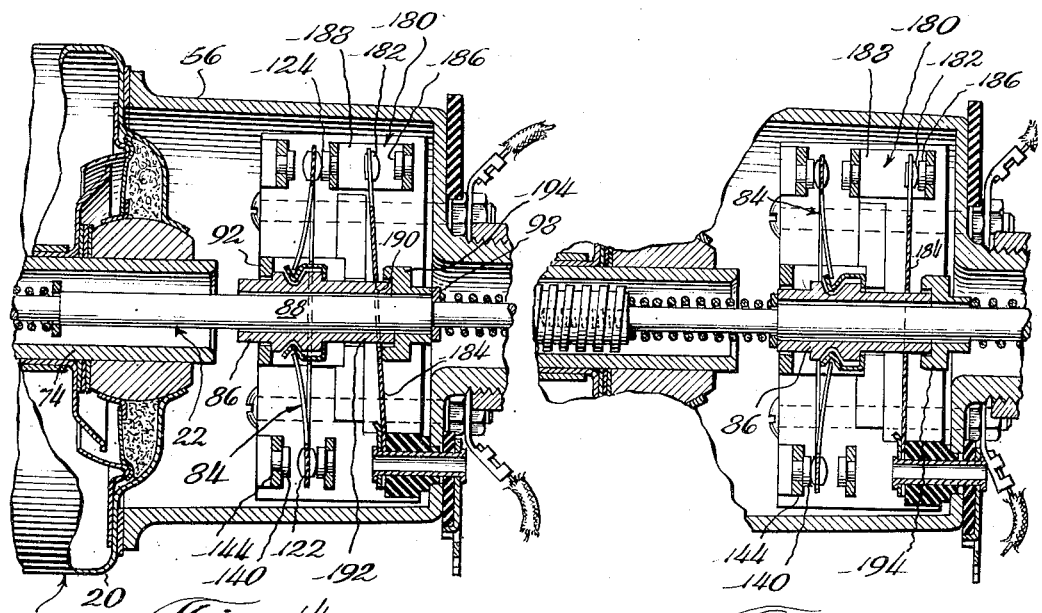

Patented July 22, 1952

2,603,813

UNITED STATES PATENT OFFICE 2,603,813

ELECTRIC WINDSHIELD WIPER

Alfred Christensen, Chicago, Ill., assignor to Stewart-Warner Corporation, Chicago, Ill., a corporation of Virginia Application December 8, 1944, Serial No. 567,248

5 Claims. (Cl. 15—253)

The present invention relates to windshield wipers and particularly to electric windshield wipers of the type operable in what may be termed a normal range of movement and which are automatically parked in a position outside of that range by the inertia of the moving parts of the apparatus. The invention is an improvement over the apparatus disclosed and claimed in the copending application of John B. Whitted, Serial No. 463,616, filed October 28, 1942, now Patent No. 2,412,850, granted December 17, 1946, upon an Electric Windshield Wiper, and assigned to the assignee of this application.

A primary object of the present invention is to provide a new and improved, efficient and economical electric windshield wiper.

Another object of the present invention is to provide an electric motor driven windshield wiper wherein the direction of operation of the wiper blades is controlled by a reversing switch and wherein the parking is also controlled by the reversing switch and what may be termed an automatic parking switch, both of which are operated by a single motor driven element.

Another object of the present invention is to provide a novel reversing and parking control unit for an electric windshield wiper.

A further object of the present invention is to provide a new and improved windshield wiper operating mechanism and more specifically an operating mechanism which may be correlated with the novel control unit to provide a windshield wiper which can be manufactured at low cost and which will be satisfactory in operation and have a long, useful life.

Other objects of the present invention will become apparent from the ensuing description, in the course of which reference is had to the accompanying drawings, in which:

Fig. 2 is an axial cross-sectional view through the windshield wiper blade operating motor and control unit. The figure also illustrates the operative mechanical connections of the motor to the windshield wiper operating means;

Fig. 3 is an enlarged cross-sectional view of the motor reversing switch and its operating means, the view being taken along the line 3—3 of Fig. 2;

Fig. 4 is a view similar to Fig. 3 taken along the broken line 4—4 of Fig. 2;

Fig. 5 is a cross-sectional view taken along the line 5—5 of Fig. 4;

Fig. 6 is a similar view taken along the line 6—6 of Fig. 4;

Fig. 7 is a transverse cross-sectional view taken along the line 7—7 of Fig. 2;

Fig. 8 is an axial cross-sectional view taken along the line 8—8 of Fig. 2;

Fig. 9 is an enlarged front elevational view of a rack and pinion arrangement for oscillating the windshield wiper through the means reciprocated by the electric motor;

Fig. 10 is a transverse cross-sectional view taken along the line 10—10 of Fig. 2;

Fig. 11 is an enlarged axial cross-sectional view like a corresponding portion of Fig. 2 illustrating the motor reversing switch in one of its two positions;

Fig. 12 is a similar view illustrating the switch in its other position;

Fig. 13 is a diagrammatic representation of the circuit connections and the motor reversing switch;

Figs. 14 and 15 are views similar to Figs. 11 and 12 of a modified embodiment of the invention; and Fig. 16 is a diagrammatic representation of the circuits and control switches of the modified embodiment of the invention.

Figure 1:
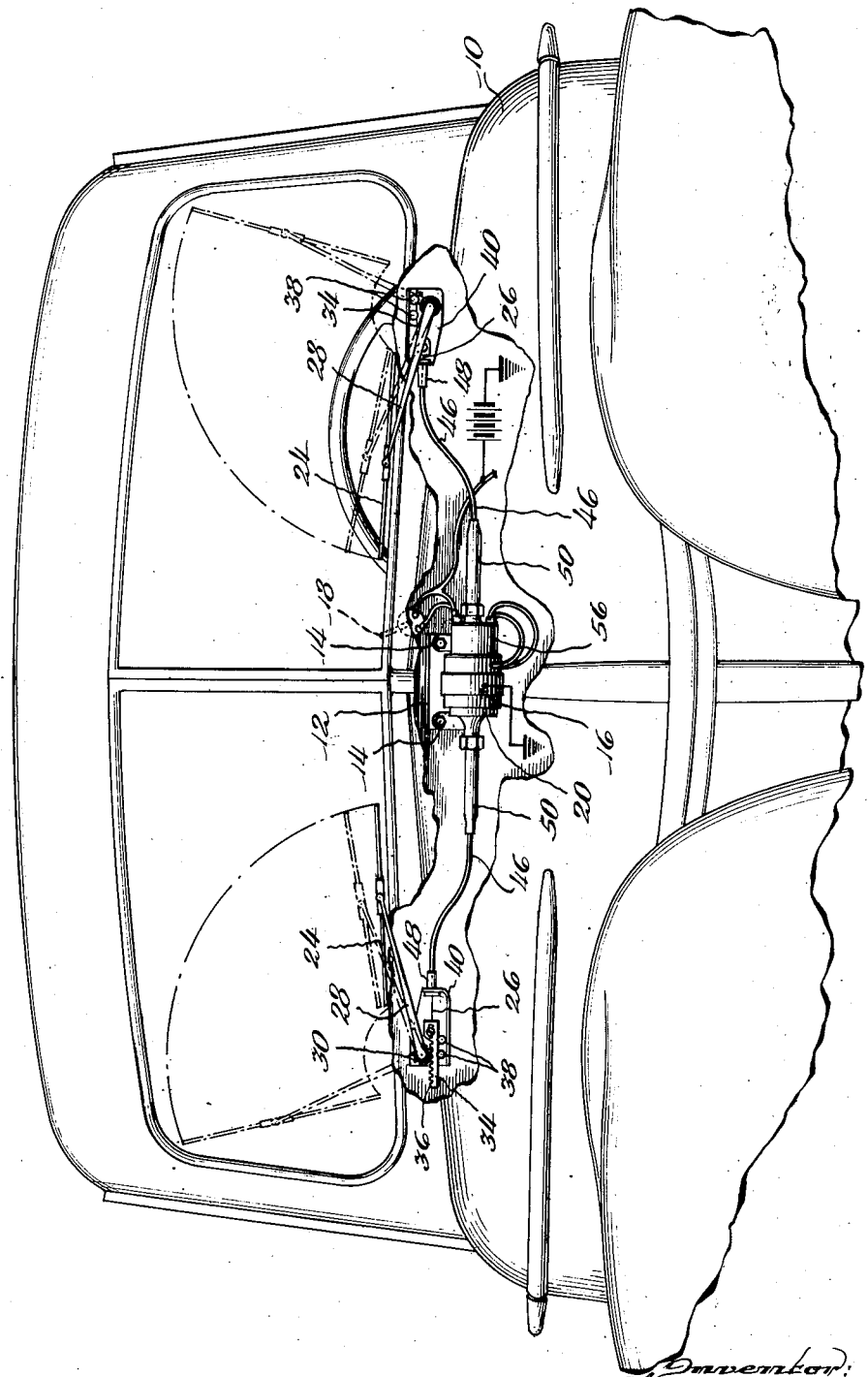
Fig. 1 is a fragmentary front elevational view, partly broken away, of an automobile upon which the apparatus of the present invention is installed. In this figure the windshield wiper blades are shown in their parked position and the phantom lines indicate the normal range of operation of the blades.

In the embodiment of the invention illustrated in Figs. 1 to 13, inclusive, the electric windshield wiper of the present invention is illustrated as being installed in an automobile 10 and as being attached to the engine side of the dashboard or the like. It is secured in place by suitable mounting means including a plate 12 and a pair of brackets 14 supporting a combined motor and control unit indicated as a whole by reference character 16. The windshield wiper is controlled by a manually operable switch 18 placed, as usual, upon the dashboard so as to be readily accessible to the operator of the vehicle.

The motor 20 which forms a part of the combined motor and control unit 16 is a reversible electric motor which, however, in accordance with one of the important features of the present invention, is adapted to impart reciprocating movement to a windshield wiper operating member indicated generally by the reference character 22 (see Fig. 2) which, for convenience, will hereinafter be referred to as a rod. The reciprocating movements of the rod are utilized to oscillate the windshield wiper blades 24 through Bowden wires 26 extending from the rod to mechanism transforming the reciprocating movement to oscillatory movement.

The windshield wiper blades are mounted upon oscillatable supporting arms 28 and are movable by means of pinions 30 (see Fig. 9) mounted upon the arm supporting shafts 32. The pinions are oscillated by rack gears 34 having gear teeth 36 held in mesh with the pinions by pairs of rollers 38 located on the side opposite the rack gears from the pinions. These rollers and the racks and pinions are all preferably supported upon suitable supporting means such as brackets 40 secured in suitable manner to the automobile. The ends of the Bowden wires 26 are adjustably secured to the rack gears as by the bolt and slot connections 44.

In accordance with another feature of the present invention, the arrangement of the windshield wiper operating means is such that the wiper blades always move in opposite directions, i. e., when one blade is moving in a clockwise direction, the other is moving in a counterclockwise direction. Furthermore, the blades are parked adjacent each other so that they occupy the least noticeable position, which is near the bottom and center portion of the windshield, as clearly illustrated in Fig. 1. This feature is achieved by placing one of the rack gears 34 below the pinion and the other above the pinion, i. e., the rack gears are placed on opposite sides of the axes of the pinions 30. As a result, when the rack gears are moved, and they are moved in unison, the windshield wiper blades are oscillated in opposite directions.

The Bowden wire 26 is encased within suitable shielding or conduit means in order that it may be guided and prevented from accumulating dirt and the like. In the present instance, the Bowden wires are led through relatively small diameter tubes 46 extending from the combined motor and control unit 16 to the brackets 40. At the bracket ends the tubes are secured to the brackets by fittings 48 (see Fig. 9). At the motor ends the tubes are secured to tubular shields 50 (see Fig. 2) projecting outwardly from opposite sides of the combined motor and control unit and within which the windshield wiper operating rod 22 is reciprocated. The outer ends 52 of the shields 50 are secured to the Bowden wire containing tubes 46 in suitable manner, as by swaging. The shields are attached to the end plates 54 and 56 of the motor and controlling unit in suitable manner as by the couplings 58 to secure the flanged ends 60 of the shields therebetween and the ends of the end plates 54 and 56, respectively.

The Bowden wires are adjustably secured to the reciprocable wiper blade operating rod 22 in suitable manner. In the instant case the left (see Fig. 2) Bowden wire 26 is secured to the threaded end 62 of the rod by a tubular extension 64 swaged to the Bowden wire and threaded onto end 62, where it is locked in place by a lock nut 66. The other Bowden wire is somewhat similarly secured to the opposite threaded end 68 of the rod by a threaded extension 70 threaded onto end 68 and to the end of the Bowden wire 26. It is locked in place by a lock nut 72.

The windshield wiper operating rod 22 is reciprocated in a novel manner by the motor 20 and the element is utilized not only to operate the wiper blades but also the control mechanism which will be described shortly and which is mounted within a housing defined by the end plate 56 of the combined motor and control unit. The rod is reciprocated by the motor shaft 74 which is internally threaded over a portion of its length as indicated by the reference character 76 and which is mounted in spaced apart bearings 77 engaging shoulders formed on the shaft to restrain axial movement of the shaft. The rod is provided with an externally threaded portion 78 engaging the threaded portion of the hollow motor shaft and it is prevented from rotating with the result that, as the motor rotates the shaft, the rod is moved axially. The rod is prevented from rotating by suitable means such as the square portion 80 passing through a square opening 82 at the outer end of end plate 54.

The motor is reversed by the novel control unit of the present invention when the windshield wiper operating rod 22 moves between predetermined limits. Consequently, the wiper blades are thus oscillated through suitable limits defining a normal operating range such as that indicated by the phantom lines in Fig. 1. The direction of motor rotation is controlled by a reversing switch indicated as a whole by reference character 84 which is operated at desired limits of movement by the axial movement of the windshield wiper operating rod 22.

The reversing switch 84 is preferably of the snap action type and is operable between two positions by an axially movable sleeve 86 (preferably made of insulating material) apertured loosely to surround an intermediate enlarged portion 88 of the windshield wiper operating rod 22. The sleeve is movable between two limiting positions indicated in Figs. 11 and 12 and which are determined by engagement of a collar-like portion of the sleeve with an insulating switch mounting plate 90 and a generally U-shaped bracket 92 secured to the mounting plate and extending axially toward the motor and apertured as indicated by reference character 94 (see Fig. 11) loosely to surround the inner end of sleeve 88.

The switch operating sleeve 88 is moved between its two positions to operate switch 84 with a snap action by the limits of axial movement of rod 22. More specifically, the sleeve is operated upon engagement with washers 96 and 98 held in abutting engagement with the central enlarged portion 88 of rod 22 by springs 100 and 102, respectively. The spring 100 encircles a reduced portion 104 of the operating rod and abuts against the washer 96 and against the threaded portion 78 of the rod. In order to facilitate construction, the portion 104 is provided with a threaded end 106 whereby it may be detachably secured to the threaded portion 78. The spring 102 abuts against the washer 98 and against a second nut 108 engaging lock washer 72.

The springs impart a degree of resiliency to the operation of the switch operating sleeve and the spring 102, in addition, may be compressed somewhat when the blades move into the parking position and the blade operating rod moves its grestest distance toward the left, because of the inertia of the moving parts of the blade operating mechanism.

The motor reversing switch 84 includes contact carrying movable switch element 110 preferably made of resilient metal such as Phosphor bronze. It includes a pair of side end-connecting parts 112 and a pair of centrally located opposed tongue-like portions 114, the inner ends of which engage grooved metal bearings 116 situated in opposed grooves 118 at the top and bottom sides of the switch operating sleeve 86. The snap action is provided by flexing the tongue-like portions 114 so that they are over center with respect to the interconnecting outer sides 112 in the two positions of the switch, which are determined by opposed fixed contacts engageable with the movable contacts 120 and 122 carried at opposite ends of the movable switch element 110.

The fixed contacts associated with movable contact 120, indicated by reference characters 124 and 126, are mounted upon conducting supporting brackets 128 and 130, respectively (see Figs. 3 to 6, inclusive). These two brackets are secured to the insulating plate 90 by rivets 132 and terminal bolts 134 and 136, respectively. The stationary contacts associated with movable contact 122, indicated by reference characters 138 and 140, are secured upon conducting terminal brackets 142 and 144, respectively. The brackets are secured to the insulating mounting plate 90 by rivets 132 and terminal bolts 146 and 148, respectively.

The motor 20 may be of any suitable reversible type. It is, however, illustrated (in Fig. 13) as being a direct current motor having an armature 150 and a pair of field windings 152 and 154 adapted selectively to be energized to rotate the motor rotor in opposite directions. One terminal of the armature is connected to ground through conductor 156 and the other to the junction of the two field windings. The other terminals of windings 152 and 154 are connected by conductors 160 and 162 to fixed contacts 140 and 138, respectively, of the reversing switch. Fixed contact 126 is connected through conductor 164 and a switch 166, which may be the conventional switch, to a battery 168 or other suitable source of power having one terminal grounded through conductor 170. The other fixed contact 124 is connected to conductor 164 through the manually operable switch 18 which is closed whenever the windshield wiper is in operation.

When the windshield wiper is to be placed in operation, the ignition switch 166 is first closed to supply power to the reversing switch. The reversing switch, in the parked position of the blades, occupies the position in which it is illustrated in Figs. 2, 11 and 13. Under these conditions and with the manual control switch 18 open, no power is supplied to the motor with the result that the motor remains inoperative.

To energize the motor to move the wiper blades, it is necessary only to close switch 18. When this is done, the motor winding 154 and the armature 150 are supplied with power from the battery through the reversing switch and the now closed manually operable switch 18. As a result, the motor is rotated in one direction to move the windshield operating rod 22 axially from its extreme left position toward the right. Such movement of rod effects movement of the windshield wiper blades through the Bowden wire connections and the rack and pinion gearing. The reversing switch remains in its indicated position until the switch operating sleeve 86 is engaged by washer 96. Some slight further movement of element 22 moves the sleeve 86 toward the right until the over-center mechanism snaps the movable switch element to its other position—the position in which it is shown in Fig. 12. Immediately the winding 154 is deenergized and winding 152 is energized to rotate the motor in the opposite direction. As a result, the operating rod is moved axially in the opposite direction until washer 98 engages the opposite end of sleeve 86 to move it to the left. When the sleeve moves to the left to move the over-center mechanism beyond center, the switch is returned to its initial position. Consequently, the windshield wiper blades are operated through what may be termed a normal operating range by reciprocation of the operating element 22 between limits determined by the actuation of the reversing switch 84 between its two positions as described above.

The mechanism of the present invention utilizes the inertia of the moving parts of the motor and associated mechanism to move the wiper blades to their parked position. Assuming that the movable contacts 120 and 122 are in engagement with stationary contacts 126 and 140, i. e., so that winding 152 is energized and the rod 22 is moving toward the left and that switch 18 is then opened. Under these conditions, the opening of the switch has no effect because no circuit is closed across contacts 124 and 142. The motor continues to rotate to move the rod to the left until washer 98 engages sleeve 86 and moves it to the left. When this occurs the switch element 110 is moved to deenergize winding 152 and to connect a circuit across contacts 124 and 142. However, the motor does not reverse because switch 18 is now open, so that the closure of the circuit across the contacts does not energize winding 154. As a result, the inertia of the moving parts moves the wiper blades beyond the normal range of movement and into their parked position.

In the embodiment of the invention illustrated in Figs. 14, 15 and 16, the control is so constructed and arranged that the opening of the manually operable switch 18 at any time will not deenergize the motor until the switch wiper blades have been properly parked. This is not true of the previously described embodiment of the invention as it may be noted from Fig. 13 that if switch 18 is opened with the reversing switch in its indicated position, the opening of the switch will immediately deenergize the motor.

In the now about to be described embodiment, an auxiliary switch, which may be called an automatic parking switch and which is indicated by reference character 180, is utilized to maintain an energizing circuit to the motor despite the opening of the manual switch 18 until such time that the motor is rotating in the proper direction to park the switch blades. The parking switch 180 is arranged to be actuated by the windshield wiper operating rod 120 and preferably substantially simultaneously with or slightly before the reversing switch. The second embodiment has not been illustrated in full because the apparatus may remain substantially the same as that heretofore described, except for the addition of the parking switch and the operating means therefor.

The parking switch includes a movable contact 182 mounted upon a resilient switch blade 184 biased to move the contact into engagement with a fixed contact 186 conductively connected to contact 124 as through a common terminal bracket 188. The blade 184 is centrally apertured as indicated by reference character 190 so as loosely to fit about an extended portion 192 of the switch operating sleeve 86. The parking switch is moved from its circuit closing to its circuit opening position when the windshield wiper blades move in parking direction by an enlarged sleeve 194 loosely surrounding portion 88 of element 22 and interposed between sleeve 86 and the washer 98.

The circuit arrangement for the second embodiment of the present invention is illustrated in Fig. 16, to which reference is now had. From this it may be noted that the circuit is substantially the same as that of Fig. 13, except for the addition of the parking switch having its fixed contact 186 conductively connected to fixed contact 124 of the reversing switch and having its movable switch blade connected to conductor 164 through branch conductor 196. The parking switch is thus in parallel with the manually operable switch 18.

When the ignition and manual switches are open, the windshield wiper blades are parked and the operating elements are in the positions in which they are shown in Figs. 14 and 16. To place the windshield wipers in operation, it is necessary to close the ignition switch 166 and the manually operable switch 18. When they have been closed, winding 154 is energized through these two switches and the reversing switch and the motor move the reciprocating windshield wiper operating rod 22 toward the right. Initial movement to the right permits the parking switch 184 to close, but such closing has no effect as the switch is connected in parallel with the previously closed switch 18.

When the windshield wiper blades reach the limit of their movement, the reversing switch is operated to deenergize winding 154 and to energize winding 152. The motor operates now in the reverse direction and when the limit of movement is reached, the rod 22 operates both the reversing and auxiliary switches, preferably substantially simultaneously, the reversing switch being operated by switch 86 and the auxiliary switch by sleeve 194. The opening of the parking switch has no effect upon the operation because switch 18 remains closed.

In this embodiment of the invention, the time of opening of switch 18 is not of material moment because the control is such that the motor is energized until it is rotating in the proper direction so that its momentum will properly park the wiper blades. If the manually operable switch 18 is opened with winding 152 energized, i. e., when the motor is operating in the proper direction for parking, the motor remains energized through the reversing switch until both the latter and the parking switch are opened and occupy the positions in which they are shown in Fig. 16, after which the inertia drives the blades to their parked positions. If, on the other hand, the switch 18 is opened when the motor is rotating in the wrong direction for parking, i. e., with the reversing switch in the position shown in Fig. 16 and with the parking switch closed, then the parking switch maintains the motor energizing circuit even though switch 18 is opened. Consequently, the motor will run until the reversing switch is opened to energize winding 152 after which the motor will run until both the reversing switch and the parking switch are operated to the positions shown in Fig. 16.

While I prefer to employ the form and arrangement of the parts as shown in the drawings and as above described, the invention is not to be restricted thereto except so far as the claims may be so limited, it being understood that changes might well be made in the form and arrangement of the parts without departing from the spirit of the invention.

I claim:

1. A windshield wiper including a pair of oscillatable blades operable by an electric motor controlled by a reversing switch, including in combination, means reversibly rotated upon reverse rotation of the motor, reciprocable means operatively connected to said first mentioned means and directly reciprocated longitudinally by said first mentioned means when the latter rotates, means operable by said second mentioned means at predetermined spaced apart longitudinal positions for operating said reversing switch, rack and pinion gear means arranged to oscillate said blades in opposite angular directions in response to reciprocating movement in one direction, and means connecting said rack gear means to said reciprocated means.

2. A windshield wiper operable by a stationary electric motor controlled by a reversing switch, a manually operable switch and an automatic parking switch parallel to the manually operable switch, including in combination, an internally threaded shaft reversibly rotated upon reverse rotation of the motor, an externally threaded member within said shaft reciprocated longitudinally by said shaft, reversing switch operating means operated by said reciprocated member at predetermined limits of movement thereof, and parking switch operating means operated by said reciprocated member at one of said limits of movement.

3. A windshield wiper as claimed in claim 2, wherein said shaft is the motor shaft.

4. An electrical windshield wiper of the type operable by a stationary reversible electric motor controlled by a two-position reversing switch, including in combination, means for operating the reversing switch whereby the motor operates the wiper between normal limits of movement, and manually controlled switch means in circuit with the reversing switch controlling the energization of the motor adapted to condition the motor for deenergization by the reversing switch when the switch is operated to one position by said motor operated means, whereby the inertia of the motor and parts driven thereby are capable of parking the wiper in a position beyond the normal limits of movement of the blade, a parking switch in parallel with the manually controlled switch means for maintaining a circuit to the reversing switch independently of the manually controlled switch means when the reversing switch is in its other position, and a single member reciprocably movable in opposite directions as the motor rotates for operating both said reversing switch operating means and said parking switch.

5. A windshield wiper operable by a stationary reversible electric motor controlled by a reversing switch, including in combination, over-center mechanism for operating said switch with a snap action, an element reversibly rotated by reverse rotation of the motor, a longitudinally extending member having a driving connection to cause it to be reciprocated by rotation of said element alternately in opposite directions, means operable by the reciprocated member at two predetermined spaced apart longitudinal positions for operating said over-center mechanism, said last named means including a pair of springs movable with respect to said reciprocated member and said over-center mechanism and arranged to store energy for the operation of the over-center mechanism, whereby said over-center mechanism is effective to operate the switch with a snap action, a wiper parking control switch, and means operable by said reciprocated member at one of its said positions for operating said control switch.

ALFRED CHRISTENSEN.

REFERENCES CITED

The following references are of record in the file of this patent:

UNITED STATES PATENTS

| Number | Name | Date |
|---|---|---|
| 1,689,617 | Bornstein | Oct. 30, 1928 |
| 1,719,731 | Schroder | July 2, 1929 |
| 1,789,217 | Cherry | Jan. 13, 1931 |
| 2,046,171 | Lauer | June 30, 1936 |
| 2,259,790 | Auten | Oct. 21, 1941 |
| 2,332,911 | Hausler | Oct. 26, 1943 |
| 2,376,010 | Sacchini | May 15, 1945 |